United States Patent
Kwon et al.

(10) Patent No.: US 9,349,336 B2
(45) Date of Patent: May 24, 2016

(54) DISPLAY DEVICE HAVING HIGHER APERTURE RATIO AND LOWER POWER CONSUMPTION

(71) Applicant: Samsung Display Co., LTD., Yongin, Gyeonggi-Do (KR)

(72) Inventors: Ho-Kyoon Kwon, Seoul (KR); Dae-Ho Song, Jeollabuk-do (KR); Kee-Byem Kim, Cheonan-si (KR); Yun-Soo Kim, Asan-si (KR)

(73) Assignee: Samsung Display Co., LTD. (KR)

( * ) Notice: Subject to any disclaimer, the term of this patent is extended or adjusted under 35 U.S.C. 154(b) by 38 days.

(21) Appl. No.: 14/248,659

(22) Filed: Apr. 9, 2014

(65) Prior Publication Data

US 2015/0029080 A1 Jan. 29, 2015

(30) Foreign Application Priority Data

Jul. 29, 2013 (KR) .................. 10-2013-0089675

(51) Int. Cl.
*G09G 3/36* (2006.01)
*G02F 1/1362* (2006.01)

(52) U.S. Cl.
CPC ........ *G09G 3/3648* (2013.01); *G02F 1/136286* (2013.01); *G09G 3/3614* (2013.01); *G02F 2201/40* (2013.01); *G09G 2300/0426* (2013.01)

(58) Field of Classification Search
None
See application file for complete search history.

(56) References Cited

U.S. PATENT DOCUMENTS

| | | | |
|---|---|---|---|
| 2010/0110359 A1* | 5/2010 | Lee et al. | 349/149 |
| 2011/0187682 A1 | 8/2011 | Kim et al. | |
| 2011/0285950 A1* | 11/2011 | Su et al. | 349/139 |
| 2011/0298778 A1 | 12/2011 | Chiang | |
| 2012/0105494 A1 | 5/2012 | Lee et al. | |
| 2012/0305947 A1* | 12/2012 | Lee | 257/88 |

* cited by examiner

*Primary Examiner* — Kent Chang
*Assistant Examiner* — Benjamin Morales Fernande
(74) *Attorney, Agent, or Firm* — Innovation Counsel LLP

(57) ABSTRACT

A display device includes a plurality of pixels arranged in a column direction and in a row direction, as well as a data line connected to a pixel of a k-th column (where 'k' is a natural number) and a (k+1)-th column in an odd-numbered row of the pixels, and connected to a pixel of a (k−1)-th column and a (k+2)-th column in an even-numbered row of the pixels. A data driving part is configured to apply a data signal to the data lines.

10 Claims, 9 Drawing Sheets

DISPLAY DEVICE HAVING HIGHER APERTURE RATIO AND LOWER POWER CONSUMPTION

CROSS-REFERENCE TO RELATED APPLICATION

This application claims priority to Korean Patent Application No. 10-2013-0089675, filed on Jul. 29, 2013, and all the benefits accruing therefrom under 35 U.S.C. §119, the content of which is herein incorporated by reference in its entirety.

BACKGROUND OF THE INVENTION

1. Field of the Invention

Exemplary embodiments of the present invention relate generally to display devices. More particularly, exemplary embodiments of the present invention relate to display devices having higher aperture ratio and lower power consumption.

2. Description of the Related Art

Conventionally, a liquid crystal display device includes an LCD panel and a driving device which drives the LCD panel. The LCD panel includes a plurality of data lines and a plurality of gate lines crossing the data lines. The LCD panel further includes pixels connected to the data lines and the gate lines. The driving part includes a gate driving circuit which outputs a gate signal to the gate lines, and a data driving circuit which outputs a data signal to the data lines.

Recently, efforts to reduce the number of data driving circuits have been made in an effort to realize low cost and high driving efficiency. Some of these efforts are directed toward a structure in which two pixels adjacent to each other share one data line, which is called as a panel structure. Both a column inversion method and a dot inversion method may be applied to this structure.

The column inversion method has low power consumption. However, the column inversion method also has a low aperture ratio. The dot inversion method has a low aperture ratio. However, the dot inversion method has high power consumption.

BRIEF SUMMARY OF THE INVENTION

Exemplary embodiments of the present invention provide a display device having a higher aperture ratio and lower power consumption.

In an exemplary embodiment of a display device according to the present invention, the display device includes a plurality of pixels arranged in a column direction and in a row direction, a data line connected to one of the pixels of a k-th column (where 'k' is a natural number) and one of the pixels of a (k+1)-th column in an odd-numbered row of the pixels, and connected to one of the pixels of a (k−1)-th column and one of the pixels of a (k+2)-th column in an even-numbered row of the pixels. The display device also includes a data driving part configured to apply a data signal to the data lines.

In the exemplary embodiment, the pixels may be driven in a 1×2 dot inversion method.

In the exemplary embodiment, the display device may further include a plurality of gate lines connected to the pixels. An n-th gate line (where 'n' is a natural number) may be connected to one of the pixels that is in an odd-numbered column of the pixels and in an odd-numbered row of the pixels, an (n+1)-th gate line may be connected to one of the pixels that is in an odd-numbered column of the pixels and in an even-numbered row of the pixels, an (n+2)-th gate line may be connected to one of the pixels that is in an even-numbered column of the pixels and in an even-numbered row of the pixels, and an (n+3)-th gate line may be connected to one of the pixels that is in an even-numbered column of the pixels and in an odd-numbered row of the pixels.

In the exemplary embodiment, the display device may further include a plurality of common lines extending in the column direction. Each pixel may further include a transistor having a source and a drain. The common lines may include a same material as at least one of the source and the drain of each transistor.

In the exemplary embodiment, the common lines may be formed in the same layer as the data line.

In an exemplary embodiment of a display device according to the present invention, the display device includes a plurality of pixels arranged in a column direction and in a row direction, a data line connected to one of the pixels of a k-th column (where 'k' is a natural number) and one of the pixels of a (k+1)-th column in an odd-numbered row of the pixels, and connected to one of the pixels of a (k−1)-th column and one of the pixels of a (k+2)-th column in an even-numbered row of the pixels. The display device also includes a data driving part configured to apply a data signal to the data lines. The pixel of the even-numbered row includes an extending portion extended from the pixel into an adjacent pixel area.

In the exemplary embodiment, the pixels may be driven in a 1×2 dot inversion method.

In the exemplary embodiment, the display device may further include a plurality of gate lines connected to the pixels, An n-th gate line (where 'n' is a natural number) may be connected to one of the pixels that is in an odd-numbered column of the pixels and in an odd-numbered row of the pixels, an (n+1)-th gate line may be connected to one of the pixels that is in an odd-numbered column of the pixels and in an even-numbered row of the pixels, an (n+2)-th gate line may be connected to one of the pixels that is in an even-numbered column of the pixels and in an even-numbered row of the pixels, and an (n+3)-th gate line may be connected to one of the pixels that is in an even-numbered column of the pixels and in an odd-numbered row of the pixels.

In the exemplary embodiment, the display device may further include a plurality of common lines extending in the column direction. Each pixel may further include a transistor having a source and a drain. The common lines may include a same material as at least one of the source and the drain of each transistor.

In the exemplary embodiment, the common lines may be formed in the same layer as the data line.

In an exemplary embodiment of a display device according to the present invention, the display device includes a plurality of pixels arranged in a column direction and in a row direction, an m-th data line (where 'm' is a natural number) connected to one of the pixels of a (k−1)-th column (where 'k' is a natural number) and one of the pixels of a (k+1)-th column in an odd-numbered row of the pixels, and connected to one of the pixels of a k-th column and one of the pixels of a (k+2)-th column in an even-numbered row of the pixels, an (m+1)-th data line connected to one of the pixels of a (k+2)-th column and one of the pixels of a (k+4)-th column in an odd-numbered row of the pixels, and connected to one of the pixels of a (k+1)-th column and one of the pixels of a (k+3)-th column in an even-numbered row of the pixels, as well as a data driving part configured to apply a data signal to the data lines.

In the exemplary embodiment, the pixels may be driven in a 1×1 dot inversion method.

In the exemplary embodiment, the display device may further include a plurality of gate lines connected to the pixels. An n-th gate line (where 'n' is a natural number) may be connected to one of the pixels of a (2k−1)-th column (where 'k' is an odd number) and one of the pixels of a (2k)-th column in an odd-numbered row of the pixels, an (n+1)-th gate line may be connected to one of the pixels of a (2k−1)-th column and one of the pixels of a (2k)-th column in an even-numbered row of the pixels, an (n+2)-th gate line may be connected to one of the pixels of a (2k+1)-th column and one of the pixels of a (2k+2)-th column in an even-numbered row of the pixels, and an (n+3)-th gate line may be connected to one of the pixels of a (2k+1)-th column and one of the pixels of a (2k+2)-th column in an odd-numbered row of the pixels.

In the exemplary embodiment, the display device may further include a plurality of common lines extending in the column direction. Each pixel may further include a transistor having a source and a drain. The common lines may include a same material as at least one of the source and the drain of each transistor.

In the exemplary embodiment, the common lines may be formed in the same layer as the data lines.

In an exemplary embodiment of a display device according to the present invention, the display device includes a plurality of pixels arranged in a column direction and in a row direction. An m-th data line (where 'm' is a natural number) may be connected to one of the pixels of a (k−1)-th column (where 'k' is a natural number) and one of the pixels of a (k+1)-th column in an odd-numbered row of the pixels, and connected to one of the pixels of a k-th column and one of the pixels of a (k+2)-th column in an even-numbered row of the pixels. An (m+1)-th data line may be connected to one of the pixels of a (k+2)-th column and one of the pixels of (k+4)-th column in an odd-numbered row of the pixels, and connected to one of the pixels of a (k+1)-th column and one of the pixels of a (k+3)-th column in an even-numbered row of the pixels. A data driving part may be configured to apply a data signal to the data lines, and a pixel of a (k−1)-th column and a pixel of a k-th column in an odd-numbered row and a pixel of a (k+1)-th column and a pixel of a (k+2)-th column in an even-numbered row may each include an extending portion extended from the respective pixel into an adjacent pixel area.

In the exemplary embodiment, the pixels may be driven in a 1×1 dot inversion method.

In the exemplary embodiment, the display device may further include a plurality of gate lines connected to the pixels. An n-th gate line (where 'n' is a natural number) may be connected to one of the pixels of a (2k−1)-th column (where 'k' is an odd number) and one of the pixels of a (2k)-th column in an odd-numbered row of the pixels, an (n+1)-th gate line may be connected to one of the pixels of a (2k−1)-th column and one of the pixels of a (2k)-th column in an even-numbered row of the pixels, an (n+2)-th gate line may be connected to one of the pixels of a (2k+1)-th column and one of the pixels of a (2k+2)-th column in an even-numbered row of the pixels, and an (n+3)-th gate line may be connected to one of the pixels of a (2k+1)-th column and one of the pixels of a (2k+2)-th column in an odd-numbered row of the pixels.

In the exemplary embodiment, the display device may further include a plurality of common lines extending in the column direction. Each pixel may further include a transistor having a source and a drain. The common lines may include a same material as at least one of the source and the drain of each transistor.

In the exemplary embodiment, the common lines may be formed in the same layer as the data lines.

According to the present exemplary embodiment, a common line is formed with a source/drain metal, and thus a display area may be relatively wide. Thus, an aperture ratio and a transmissivity may be increased.

In addition, since the display device is driven by a column inversion method, the display device may have a low power consumption.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, the present invention will be explained in detail with reference to the accompanying drawings, which are not necessarily to scale.

Figure 1:
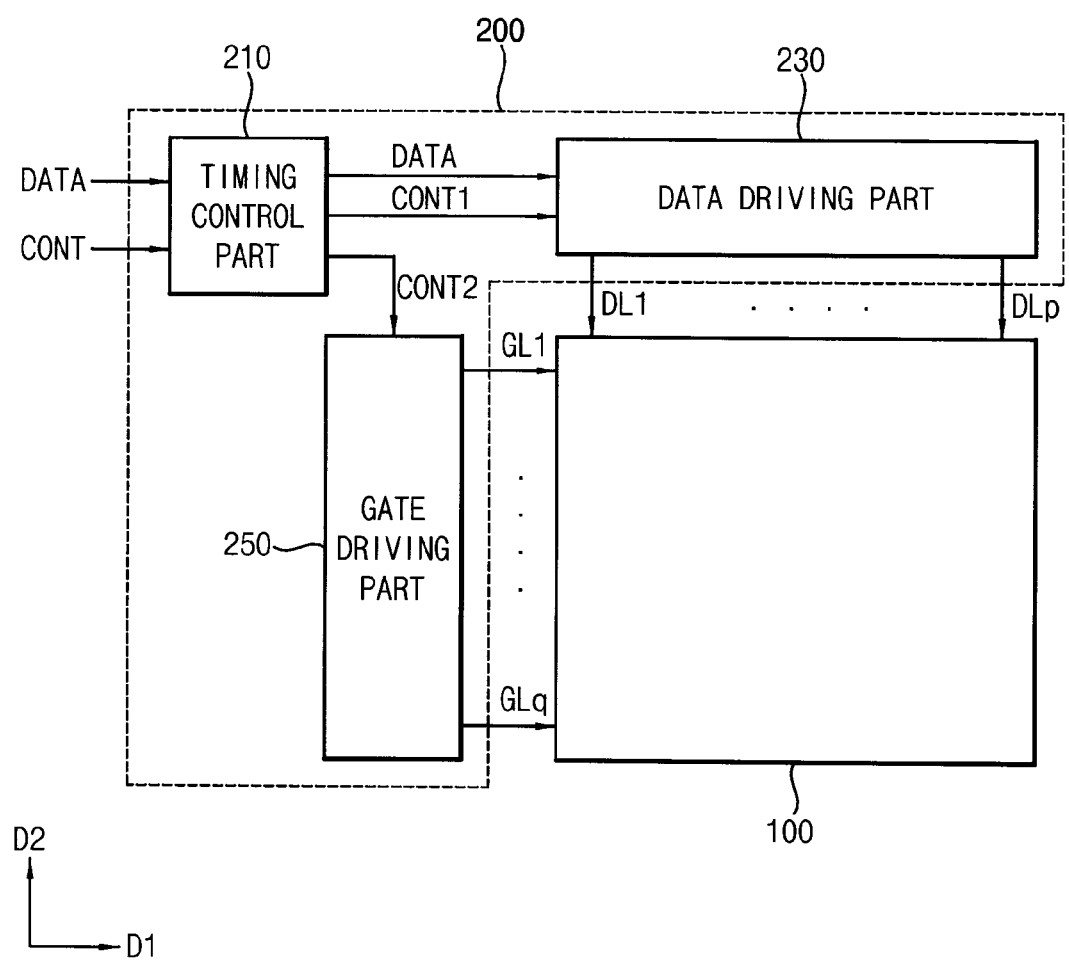
FIG. 1 is a block diagram illustrating an exemplary embodiment of a display device according to the present invention.
Figure 2:
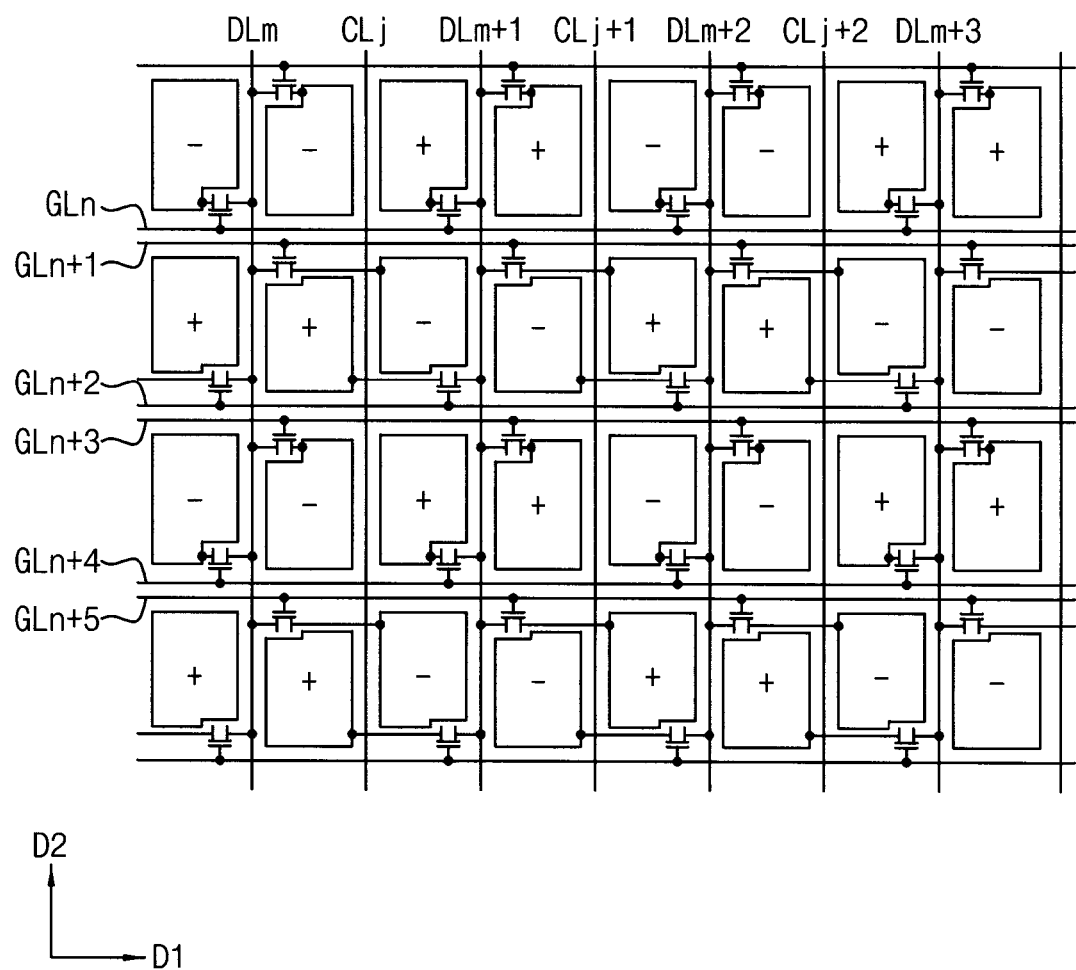
FIG. 2 is a schematic diagram illustrating a structure of a pixel of a display device according to the present invention.

FIG. 1 is a block diagram illustrating an exemplary embodiment of a display device according to the present invention. FIG. 2 is a schematic diagram illustrating a structure of a pixel of a display device according to the present invention.

Referring to FIGS. 1 and 2, a display device includes a display panel 100 and a panel driving part 200 driving the display panel 100.

The display panel 100 may have a frame shape having a first side extended in a first direction D1 and a second side extended in a second direction D2 substantially crossing the first direction D1. A plurality of gate lines and a plurality of data lines crossing the gate lines are formed on the display panel 100.

The gate lines each extend in the first direction D1 and are arranged side by side along the second direction D2. The data lines are extended in the second direction D2 and are arranged side by side along the first direction D1.

The display panel 100 includes a plurality of pixels that are arranged in the first direction D1 and the second direction D2. The pixels may include a red pixel, a green pixel and a blue pixel, or any other colors as desired. Each color of the pixels is disposed in some periodic manner on the display panel 100.

The panel driving part 200 includes a timing control part 210, a data driving part 230 and a gate driving part 250.

The timing control part 210 receives a data signal DATA and a control signal CONT from an external device (not shown). The control signal CONT may include a main clock signal MCLK, a vertical synchronizing signal VSYNC, a horizontal synchronizing signal HSYNC, a data enable signal DE, etc.

The timing control part 210 generates a first control signal CONT1 for controlling a driving timing of the data driving part 230 and a second control signal CONT2 for controlling a driving timing of the gate driving part 250 by using the control signal CONT. The first control signal CONT1 may include a horizontal start signal STH, a load signal TP, a data clock signal DCLK, an inversion signal POL, etc. The second control signal CONT2 may include a vertical start signal STV, a gate clock signal GCLK, an output enable signal OE, etc.

The data driving part 230 is disposed at a first side portion of the display panel 100 to output a data voltage to the data lines. The data driving part 230 converts a digital data signal provided from the timing control part 210 into an analog data voltage, and outputs the analog data voltage to the data lines. The data driving part 230 inverts the polarity of the data voltage in response to an inversion signal provided from the timing control part 210.

The data driving part 230 respectively applies data signals to a plurality of data lines formed on the display panel 100. For example, during an N-th frame, the data driving part 230 applies a data signal of a negative polarity (−) to an m-th data line DLm, and applies a data signal of a positive polarity (+) to an (m−1)-th data line DLm−1 and an (m+1)-th data line DLm+1 adjacent to the m-th data line DLm, respectively. Then, during an (N+1)-th frame, the data driving part 230 applies data signals having respective polarities opposite to those of the data signals applied during the N-th frame. Thus, the data driving part 230 may drive the display panel 100 in a column inversion driving method. In this case, 'm' and 'N' are natural numbers.

The gate driving part 250 is disposed at a second side portion of the display panel 100 to sequentially output a gate signal to the gate lines. The gate driving part 250 generates a gate signal by using the second control signal CONT2 and gate on/off voltages provided from a voltage generating part (not shown).

The gate driving part 250 sequentially applies gate signals to a plurality of gate lines formed on the display panel 100. For example, the gate driving part 250 sequentially applies gate signals to a pair of gate lines, that are an (n−1)-th gate line GLn−1 and an n-th gate line GLn, during a horizontal period (1H).

The panel driving part 200 may drive the display panel 100 in accordance with an inversion method. For example, as shown in FIG. 2, the panel driving part 200 may provide the display panel 100 with a data signal which is inverted between adjacent data lines. The display panel 100 may be driven by a 1×2 dot inversion method, in which one-dot inversion is performed in the first side direction and two-dot inversion is performed in the second side direction.

The pixels are arranged in a plurality of pixel rows and in a plurality of pixel columns, and can be driven in a 1×2 dot inversion method. An m-th data line is connected with a pixel of a k-th column ('k' is a natural number) and a (k+1)-th column in an odd-numbered row, and is connected with a pixel of a (k−1)-th column and a (k+2)-th column in an even-numbered row. The data lines are disposed along not every one pixel column but every two pixel columns (i.e. every other pixel column).

The gate lines each extend in the first direction D1 that is a first side direction of the display panel 100, to be arranged side by side along the second direction D2. Two gate lines may be disposed between adjacent pixel rows. For example, an n-th gate line and an (n+1)-th gate line are disposed between adjacent pixel rows. An n-th gate line ('n' is a natural number) is connected with a pixel of an odd-numbered column in an odd-numbered row. An (n+1)-th gate line is connected with a pixel of an odd-numbered column in an even-numbered row. An (n+2)-th gate line is connected with a pixel of an even-numbered column in an even-numbered row. An (n+3)-th gate line is connected with a pixel of an even-numbered column in an odd-numbered row. A connecting structure of the n-th gate line, the (n+1)-th gate line, the (n+2)-th gate line and the (n+3)-th gate line is periodically repeated, as shown for example in FIG. 2.

The data lines each extend in the second direction D2 that is a second side direction of the display panel 100, to be arranged side by side along the first direction D1. The data lines are disposed along not every one pixel column but every two pixel columns. A plurality of common lines is disposed between the pixels along which the data lines are not disposed. The common lines each extend in the second direction D2 to be arranged side by side along the first direction D1. The common lines are generally parallel with the data lines. The common lines are formed in the same layer as the data lines.

Figure 3:
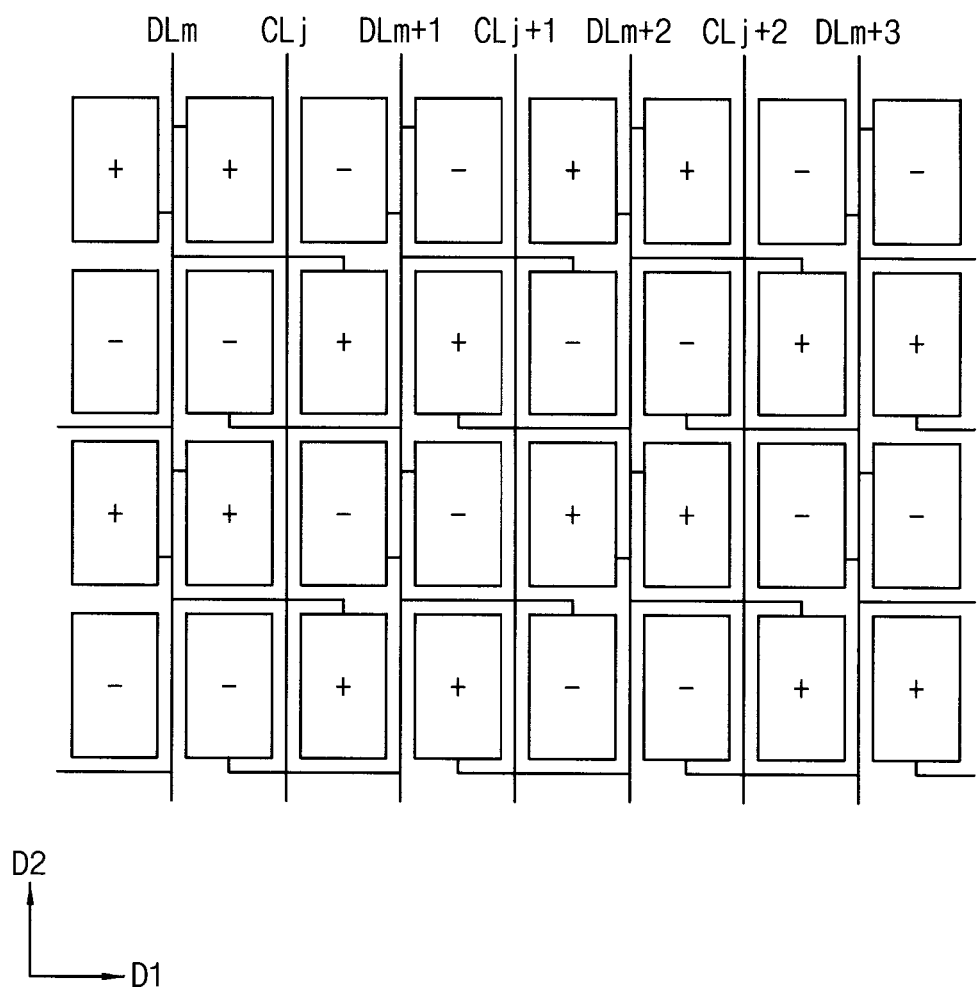
FIG. 3 is a schematic diagram illustrating an inversion of a pixel of a display device according to the present invention.

FIG. 3 is a schematic diagram illustrating an inversion of a pixel of a display device according to the present invention.

Referring to FIG. 3, the display panel 100 includes a plurality of pixels that are arranged in the first direction D1 and the second direction D2. The pixels may include a red pixel, a green pixel and a blue pixel. Each color of the pixels is periodically disposed on the display panel 100.

The data lines and the common lines are disposed in alternating manner between the pixel columns. As with FIG. 2 above, the data lines extend in the second direction D2, and are disposed along every other pixel column. The common lines are disposed between those pixel columns in which the data lines are not disposed, and are thus disposed along every other pixel column. Like the data lines, the common lines extend in the second direction D2. That is, the common lines are generally parallel with the data lines. The common lines can be formed in the same layer as the data lines.

An m-th data line is connected with a pixel of a k-th column ('k' is a natural number) and a (k+1)-th column in an odd-numbered row, and is connected with a pixel of a (k−1)-th column and a (k+2)-th column in an even-numbered row. In each frame, a data signal having a first polarity is applied to the m-th data line, and data signals having a second polarity are applied to an (m−1)-th data line and an (m+1)-th data line adjacent to the m-th data line. Accordingly, data voltages having different (i.e. alternating) polarities such as in a sequence of "+, −, +, −, +" are applied to each pixel column, and data voltages having different polarities such as in a sequence of "+, +, −, −, +, +, −, −" are applied to each pixel row. One-dot inversion is performed on the display panel 100 in a second side direction thereof in accordance with the pixel structure, and two-dot inversion is performed on the display panel 100 in a first side direction thereof. Thus, the display panel 100 may be driven using a 1×2 dot inversion method.

Figure 4:
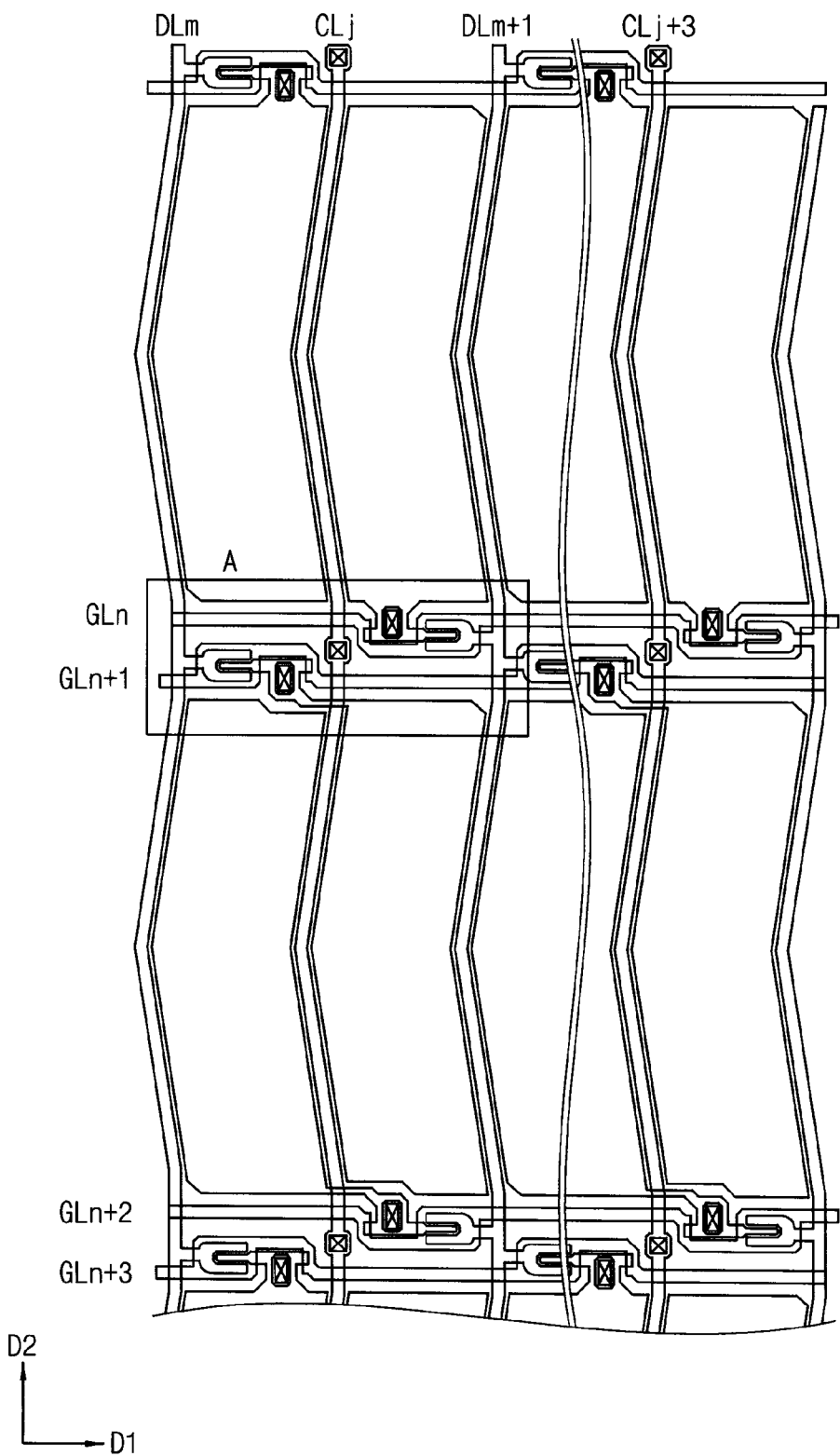
FIG. 4 is a plan view illustrating an exemplary embodiment of a display panel according to the present invention.

FIG. 4 is a plan view illustrating an exemplary embodiment of a display panel according to the present invention.

Referring to FIG. 4, the display panel 100 according to the present exemplary embodiment includes a plurality of pixels arranged in a plurality of pixel rows and in a plurality of pixel columns, as well as the corresponding gate lines, data lines and common lines.

The gate lines are extended in the first direction D1. Two gate lines may be disposed between adjacent pixel rows. For example, an n-th gate line and an (n+1)-th gate line are disposed between two adjacent pixel rows. An n-th gate line ('n' is a natural number) is connected with a pixel of an odd-numbered column in an odd-numbered row. An (n+1)-th gate line is connected with a pixel of an odd-numbered column in an even-numbered row. An (n+2)-th gate line is connected with a pixel of an even-numbered column in an even-numbered row. An (n+3)-th gate line is connected with a pixel of an even-numbered column in an odd-numbered row. The gate driving part sequentially applies gate signals to a plurality of gate lines formed on the display panel. For example, the gate driving part sequentially applies gate signals to a pair of gate lines, e.g., an n-th gate line GLn and an (n+1)-th gate line GLn+1, during a horizontal period (1H).

The data lines extend in the second direction D2. The data lines are extended in a direction crossing the gate lines. The data lines are disposed in not every one pixel column but every two pixel columns. An m-th data line is connected with a pixel of a k-th column ('k' is a natural number) and a (k+1)-th column in an odd-numbered row, and is connected with a pixel of a (k−1)-th column and a (k+2)-th column in an even-numbered row.

A data signal having a first polarity is applied to the m-th data line, and a data signal having a second polarity is applied to the (m−1)-th data line and the (m+1)-th data line, during one frame. Accordingly, data voltages having different polarities such as in a sequence of "+, −, +, −, +" are applied to the pixel column, and data voltages having different polarities such as in a sequence of "+, +, −, −, +, +, −, −" are applied to the pixel row. One-dot inversion is performed on the display panel 100 in a second side direction thereof in accordance with the pixel structure, and two-dot inversion is performed on the display panel 100 in a first side direction thereof. Thus, the display panel 100 may be driven using a 1×2 dot inversion method.

A plurality of common lines is disposed between the pixels along which the data lines are not disposed. The common lines extend in the second direction D2. The common lines are parallel with the data lines. The common lines are formed in the same layer as the data lines. Generally, when the pixel is driven by a column inversion method, a common line is formed with a gate metal, and a data line is formed with a source/drain metal. In addition, a data signal line is formed in an area in which a gate black matrix is formed. Due to the data signal line formed in an area in which a gate black matrix is formed, a display area may be relatively narrow. Thus, an aperture ratio and a transmissivity may be decreased. However, a display device according to the present exemplary embodiment drives a pixel using a column inversion method where common lines are formed with source/drain metal, and thus a display area may be relatively wide. Thus, an aperture ratio and a transmissivity may be increased. The source/drain metal may include copper (Cu), silver (Ag), chrome (Cr), molybdenum (Mo), aluminum (Al), titanium (Ti), manganese (Mn) and a mixture thereof.

Figure 5:
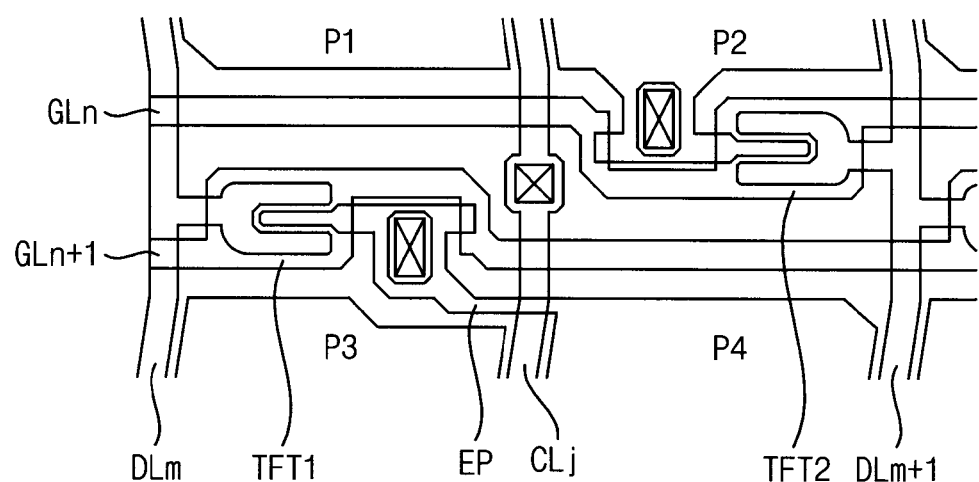
FIG. 5 is a plan view magnifying area A of FIG. 4.

FIG. 5 is a plan view magnifying area A of FIG. 4.

Referring to FIG. 5, a display panel 100 according to the present exemplary embodiment includes a first pixel P1, a second pixel P2, a third pixel P3, a fourth pixel P4, an n-th gate line GLn, an (n+1)-th gate line GLn+1, an m-th data line DLm, an (m+1)-th data line DLm+1 and a j-th common line CLj. In addition, a pixel electrode disposed in the fourth pixel P4 includes an extending portion EP. The extending portion EP is extended from the pixel electrode to be connected with a thin film transistor of an adjacent pixel.

The n-th gate line GLn is connected with the second pixel P2. The (n+1)-th gate line GLn+1 is connected with the fourth pixel P4.

The m-th data line DLm is connected with the fourth pixel P4. The (m+1)-th data line DLm+1 is connected with the second pixel P2. The m-th data line DLm is connected with the pixel electrode of the fourth pixel P4 by the extending portion EP through a first thin film transistor TFT1. The first thin film transistor TFT1 is disposed in or near an area in which the third pixel P3 is disposed. In conventional devices, the third pixel P3 would be connected with the m-th data line DLm through the first thin film transistor TFT1. However, the first thin film transistor TFT1 of the display panel 100 according to the present exemplary embodiment is not is connected with the third pixel P3, but is instead connected with the fourth pixel P4. A second thin film transistor TFT2 is connected with the second pixel P2.

In one frame, a data signal having a first polarity is applied to the m-th data line, and a data signal having a second polarity is applied to the (m−1)-th data line and the (m+1)-th data line. Accordingly, data voltages having different polarities such as in a sequence of "+, −, +, −, +" are applied to the pixel column, and data voltages having different polarities such as in a sequence of "+, +, −, −, +, +, −, −" are applied to the pixel row.

Figure 6:
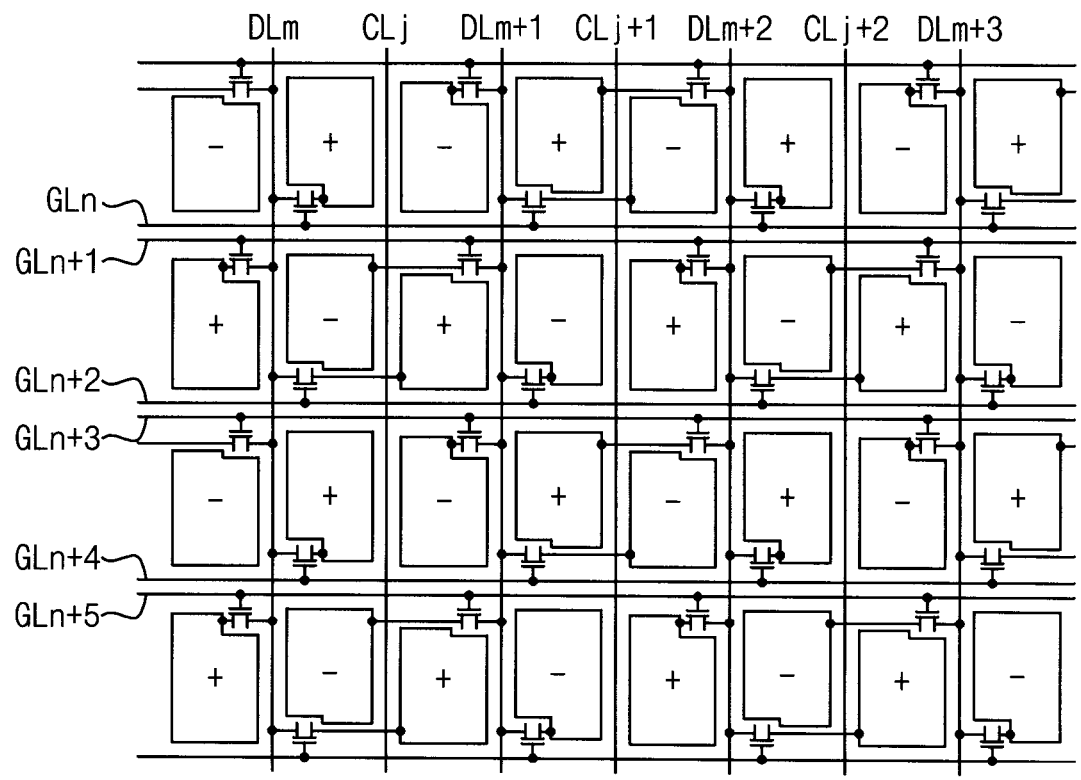
FIG. 6 is a schematic diagram illustrating a structure of a pixel of a display device according to the present invention.
Figure 6:

FIG. 6 is a schematic diagram illustrating a structure of a pixel of a display device according to another embodiment of the present invention.

The display device according to the present exemplary embodiment is substantially similar to the display device according to the previous exemplary embodiment except for a connecting structure between data lines and pixels, and use of a 1×1 dot inversion method. Accordingly, the same reference numerals are used for same elements and repetitive explanation will be omitted.

Referring to FIG. 6, the display panel 100 may have a frame shape having a first side extended in a first direction D1 and a second side extended in a second direction D2 substantially crossing the first direction D1. A plurality of gate lines and a plurality of data lines crossing the gate lines are formed on the display panel 100.

The gate lines extend in the first direction D1 that is a first side direction of the display panel 100, to be arranged side by side along the second direction D2. The data lines are extended in the second direction D2 that is a second side direction of the display panel 100, to be arranged side by side along the first direction D1.

The display panel 100 includes a plurality of pixels that are arranged in the first direction D1 and the second direction D2 crossing the first direction D1. The pixels may include a red pixel, a green pixel and a blue pixel. Each color of the pixels is periodically disposed on the display panel 100.

The panel driving part 200 drives the display panel 100 in accordance with an inversion method. For example, as shown in FIG. 6, the panel driving part 200 may provide the display panel 100 with a data signal which is inverted between adjacent data lines. The display panel 100 may be driven by a 1×1 dot inversion method, in which one-dot inversion is performed in the first side direction and one-dot inversion is performed in the second side direction.

The pixels are arranged in a plurality of pixel rows and in a plurality of pixel columns, and are driven in a 1×1 dot inversion method. An m-th data line is connected with a pixel of a (k−1)-th column ('k' is a natural number) and a (k+1)-th column in an odd-numbered row, and is connected with a pixel of a k-th column and a (k+2)-th column in an even-numbered row. A (m+1)-th data line is connected with a pixel of a (k+2)-th column and a (k+4)-th column in an odd-numbered row, and is connected with a pixel of a (k+1)-th column and a (k+3)-th column in an even-numbered row. The data lines are disposed not along every pixel column but adjacent to every other pixel column.

The gate lines are extended in the first direction D1. Two gate lines may be disposed between adjacent pixel rows. For example, an n-th gate line ('n' is a natural number) is connected with a pixel of a (2k−1)-th column ('k' is an odd number) and a (2k)-th column in an odd-numbered row. An (n+1)-th gate line is connected with a pixel of a (2k−1)-th column and a (2k)-th column in an even-numbered row. An (n+2)-th gate line is connected with a pixel of a (2k+1)-th column and a (2k+2)-th column in an even-numbered row. An (n+3)-th gate line is connected with a pixel of a (2k+1)-th column and a (2k+2)-th column in an odd-numbered row. A connecting structure of the n-th gate line, the (n+1)-th gate line, the (n+2)-th gate line and the (n+3)-th gate line is repeated in periodic fashion.

The data lines are extended in the second direction D2 and are disposed along every other pixel column. A plurality of common lines is disposed between the pixels in which the data lines are not disposed. The common lines are extended in the second direction D2 so as to be oriented generally parallel with the data lines. The common lines are formed in the same layer as the data lines.

Figure 7:
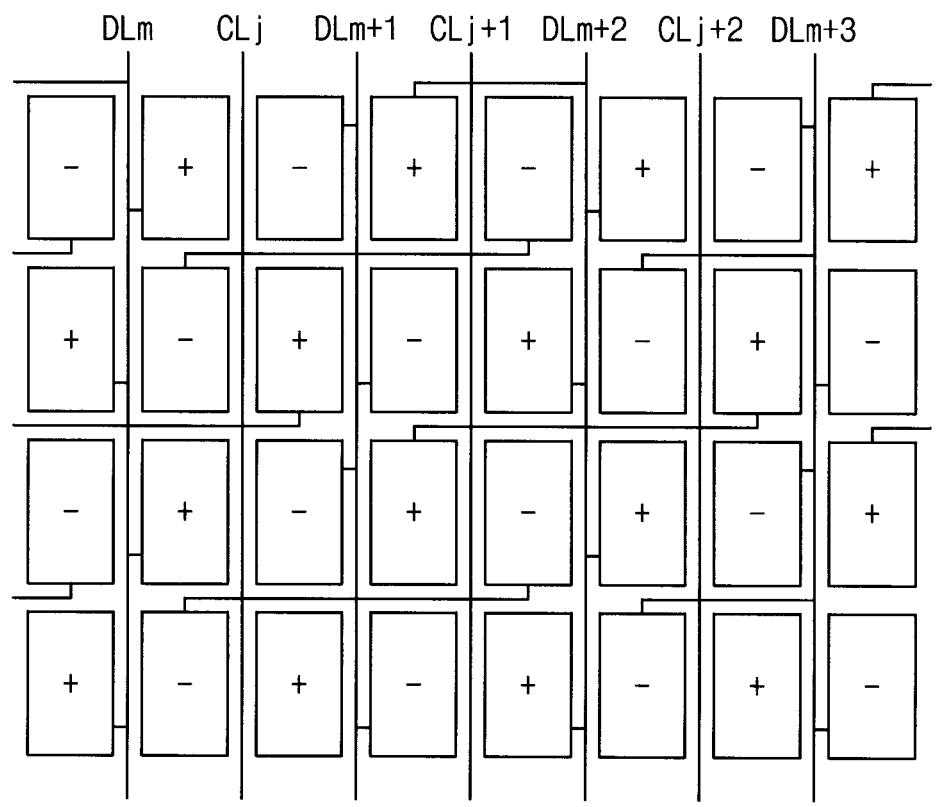
FIG. 7 is a schematic diagram illustrating an inversion of a pixel of a display device according to the present invention.
Figure 7:

FIG. 7 is a schematic diagram illustrating an inversion of a pixel of a display device according to the present invention.

Referring to FIG. 7, the display panel 100 includes a plurality of pixels that are arranged in the first direction D1 and the second direction D2 crossing the first direction D1. The pixels may include a red pixel, a green pixel and a blue pixel. Each color of the pixels may be periodically disposed on the display panel 100.

The data lines and the common lines are disposed in alternating manner along the pixel columns. The data lines extend in the second direction D2 to be arranged side by side along the first direction D1. The data lines are disposed along not every one pixel column but every other pixel column. The common lines are disposed along the pixel columns in which the data lines are not disposed. The common lines are disposed along every other pixel column. The common lines extend in the second direction D2 generally parallel with the data lines. The common lines can be formed in the same layer as the data lines.

An m-th data line is connected with a pixel of a (k−1)-th column ('k' is a natural number) and a (k+1)-th column in an odd-numbered row, and is connected with a pixel of a k-th column and a (k+2)-th column in an even-numbered row. An (m+1)-th data line is connected with a pixel of a (k+2)-th column and a (k+4)-th column in an odd-numbered row, and is connected with a pixel of a (k+1)-th column and a (k+3)-th column in an even-numbered row.

During one frame, a data signal having a first polarity is applied to the m-th data line, and data signals having a second polarity are applied to an (m−1)-th data line and an (m+1)-th data line adjacent to the m-th data line. Accordingly, data voltages having different polarities such as in a sequence of "−, +, −, +, −, +" are applied to the pixel column, and data voltages having different polarities such as in a sequence of "−, +, −, +, −, +" are applied to the pixel row. One-dot inversion is performed on the display panel 100 in a first side direction thereof in accordance with the pixel structure, and one-dot inversion is performed on the display panel 100 in a second side direction thereof. Thus, the display panel 100 may be driven using a 1×1 dot inversion method.

Figure 8:
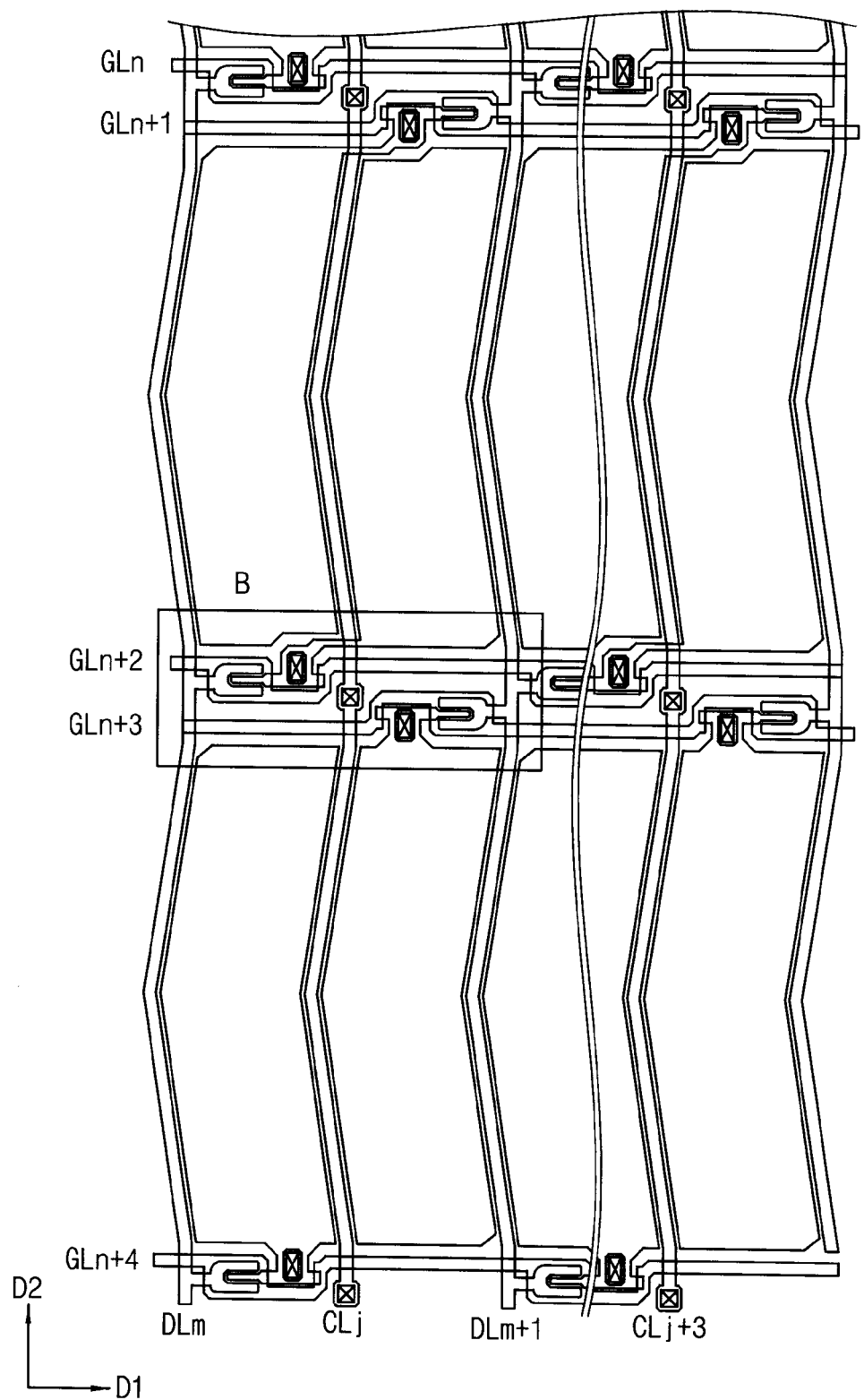
FIG. 8 is a plan view illustrating an exemplary embodiment of a display panel according to the present invention.

FIG. 8 is a plan view illustrating an exemplary embodiment of a display panel according to the present invention.

Referring to FIG. 8, the display panel 100 according to the present exemplary embodiment includes a plurality of pixels arranged in a plurality of pixel rows and in a plurality of pixel columns, as well as the corresponding gate lines, data lines and common lines.

The gate lines extend in the first direction D1. Two gate lines may be disposed between the same two adjacent pixel rows. For example, an n-th gate line ('n' is a natural number) is connected with a pixel of a (2k−1)-th column ('k' is an odd number) and a (2k)-th column in an odd-numbered row. A (n+1)-th gate line is connected with a pixel of a (2k−1)-th column and a (2k)-th column in an even-numbered row. A (n+2)-th gate line is connected with a pixel of a (2k+1)-th column and a (2k+2)-th column in an even-numbered row. A (n+3)-th gate line is connected with a pixel of a (2k+1)-th column and a (2k+2)-th column in an odd-numbered row. A connecting structure of the n-th gate line, the (n+1)-th gate line, the (n+2)-th gate line and the (n+3)-th gate line repeat in periodic manner. Thus, the gate driving part sequentially applies gate signals to a pair of gate lines, that are an n-th gate line GLn and an (n+1)-th gate line GLn+1 during a horizontal period (1H).

The data lines are extended in the second direction D2 to cross the gate lines. The data lines are disposed along every other pixel column. An m-th data line is connected with a pixel of a (k−1)-th column ('k' is a natural number) and a (k+1)-th column in an odd-numbered row, and is connected with a pixel of a k-th column and a (k+2)-th column in an even-numbered row. A (m+1)-th data line is connected with a pixel of a (k+2)-th column and a (k+4)-th column in an odd-numbered row, and is connected with a pixel of a (k+1)-th column and a (k+3)-th column in an even-numbered row.

A data signal having a first polarity is applied to the m-th data line, and data signals having a second polarity are applied to an (m−1)-th data line and an (m+1)-th data line adjacent to the m-th data line, during one frame. Accordingly, data voltages having different polarities such as in a sequence of "−, +, −, +, −, +" are applied to the pixel column, and data voltages having different polarities such as in a sequence of "−, +, −, +, −, +" are applied to the pixel row. One-dot inversion is performed on the display panel 100 in a first side direction thereof in accordance with the pixel structure, and one-dot inversion is performed on the display panel 100 in a second side direction thereof. Thus, the display panel 100 may be driven using a 1×1 dot inversion method.

A plurality of common lines is disposed between the pixel columns along which the data lines are not disposed. The common lines are extended in the second direction D2. The common lines are generally parallel with the data lines. The common lines are formed in the same layer as the data lines. Generally, when the pixel is driven by column inversion method, a common line is formed with a gate metal, and a data line is formed with a source/drain metal. In addition, a data signal line is formed in an area in which a gate black matrix is formed. Due to the data signal line formed in an area in which a gate black matrix is formed, a display area may be relatively narrow. Thus, an aperture ratio and a transmissivity may be decreased. However, a display device according to the present exemplary embodiment may drive a pixel using a column inversion method and common lines formed with source/drain metal, and thus a display area may be relatively wide. Thus, an aperture ratio and a transmissivity may be increased. The source/drain metal may include copper (Cu), silver (Ag), chrome (Cr), molybdenum (Mo), aluminum (Al), titanium (Ti), manganese (Mn) and a mixture thereof.

Figure 9:
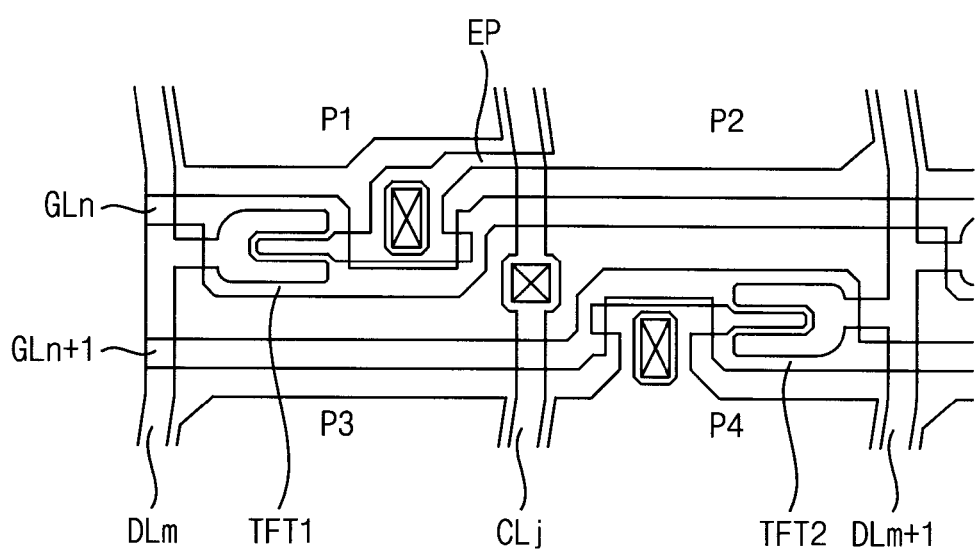
FIG. 9 is a plan view magnifying a B of FIG. 8.

FIG. 9 is a plan view magnifying a B of FIG. 8.

Referring to FIG. 9, a display panel 100 according to the present exemplary embodiment includes a first pixel P1, a second pixel P2, a third pixel P3, a fourth pixel P4, an n-th gate line GLn, an (n+1)-th gate line GLn+1, an m-th data line DLm, an (m+1)-th data line DLm+1 and a j-th common line CLj. In addition, a pixel electrode disposed in the second pixel P2 includes an extending portion EP. The extending portion EP is extended from the pixel electrode to be connected with a thin film transistor of an adjacent pixel.

The n-th gate line GLn is connected with the second pixel P2. The (n+1)-th gate line GLn+1 is connected with the fourth pixel P4.

The m-th data line DLm is connected with the second pixel P2. The (m+1)-th data line DLm+1 is connected with the fourth pixel P4. The m-th data line DLm is connected with the pixel electrode of the second pixel P2 by the extending portion EP through a first thin film transistor TFT1. The first thin film transistor TFT1 is disposed in an area in which the first pixel P1 is disposed. Thus, in conventional displays, the first pixel P1 is connected with the m-th data line DLm through the first thin film transistor TFT1. However, the first thin film transistor TFT1 of the display panel 100 according to the present exemplary embodiment is not is connected with the first pixel P1, but is instead connected with the second pixel P2. A second thin film transistor TFT2 is connected with the fourth pixel P4.

A data signal having a first polarity is applied to the m-th data line, and data signals is having a second polarity are applied to an (m−1)-th data line and an (m+1)-th data line adjacent to the m-th data line, during one frame. Accordingly, data voltages having different polarities such as in a sequence of "−, +, −, +, −, +" are applied to the pixel column, and data voltages having different polarities such as in a sequence of "−, +, −, +, −, +" are applied to the pixel row.

According to the present exemplary embodiment, a data signal line is not formed in an area in which a gate black matrix is formed, and thus a display area may be relatively wide. Thus, an aperture ratio and a transmissivity may be increased.

In addition, since the display device is driven by a column inversion method, the display device may have relatively low power consumption.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. The various features of the above described embodiments can be mixed and matched in any combination or combinations, so as to form further embodiments contemplated by the invention. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display device comprising:
   a plurality of pixels arranged in a column direction and in a row direction;
   a data line extending in the column direction;
   a first common line positioned adjacent to the data line on a first side of the data line, and a second common line positioned adjacent to the data line on a second side of the data line, the first and second common lines extending in the column direction; and
   a data driving part configured to apply a data signal to the data line;
   wherein in an odd-numbered row of the pixels, the data line is connected to one of the pixels of a k-th column (where 'k' is a natural number) and one of the pixels of a (k+1)-th column, and in an even-numbered row of the pixels, the data line is connected to one of the pixels of a (k−1)-th column and one of the pixels of a (k+2)-th column by extending portions extending across the first and second common lines, respectively; and
   wherein the data line is connected to the one of the pixels of the (k−1)-th column through a switching element positioned in the k-th column, and to the one of the pixels of the (k+2)-th column through a switching element positioned in the (k+1)-th column.

2. The display device of claim 1, wherein the pixels are configured to be driven in a 1×2 dot inversion method.

3. The display device of claim 1, further comprising:
   a plurality of gate lines connected to the pixels,
   wherein an n-th gate line (where 'n' is a natural number) is connected to one of the pixels that is in an odd-numbered column of the pixels and in an odd-numbered row of the pixels, an (n+1)-th gate line is connected to one of the pixels that is in an odd-numbered column of the pixels and in an even-numbered row of the pixels, an (n+2)-th gate line is connected to one of the pixels that is in an even-numbered column of the pixels and in an even-numbered row of the pixels, and an (n+3)-th gate line is connected to one of the pixels that is in an even-numbered column of the pixels and in an odd-numbered row of the pixels.

4. The display device of claim 1,
   wherein each pixel further comprises a transistor having a source and a drain, and wherein the common lines comprise a same material as at least one of the source and the drain of each transistor.

5. The display device of claim 4, wherein the common lines are formed in the same layer as the data line.

6. A display device comprising:
   a plurality of pixels arranged in a column direction and in a row direction;
   an m-th data line (where 'm' is a natural number) and an (m+1)-th data line arranged in alternating manner with three common lines so that one of the common lines is positioned at each opposing side of each data line;
   wherein in an odd-numbered row of the pixels, the m-th data line is connected to one of the pixels of a (k−1)-th column (where 'k' is a natural number) by an extending portion extending across one of the common lines and is also connected to one of the pixels of a (k+1)-th column, and wherein in an even-numbered row of the pixels, the m-th data line is connected to one of the pixels of a k-th column and one of the pixels of a (k+2)-th column by another extending portion extending across one of the common lines;

wherein in an odd-numbered row of the pixels, the (m+1)-th data line is connected to one of the pixels of a (k+2)-th column and is also connected to one of the pixels of a (k+4)-th column by a further extending portion extending across one of the common lines, and wherein in an even-numbered row of the pixels, the (m+1)-th data line is connected to one of the pixels of a (k+1)-th column by a still further extending portion extending across one of the common lines and is also connected to one of the pixels of a (k+3)-th column; and a data driving part configured to apply a data signal to the data lines;

wherein the m-th data line is connected to the one of the pixels of the (k−1)-th column through a switching element positioned in the k-th column, and to the one of the pixels of the (k+2)-th column through a switching element positioned in the (k+1)-th column.

7. The display device of claim 6, wherein the pixels are driven in a 1×1 dot inversion method.

8. The display device of claim 6, further comprising:
a plurality of gate lines connected to the pixels,
wherein an n-th gate line (where 'n' is a natural number) is connected to one of the pixels of a (2j−1)-th column (where 'j' is an odd number) and one of the pixels of a (2-j)-th column in an odd-numbered row of the pixels, an (n+1)-th gate line is connected to one of the pixels of a (2j−1)-th column and one of the pixels of a (2-j)-th column in an even-numbered row of the pixels, an (n+2)-th gate line is connected to one of the pixels of a (2-j+1)-th column and one of the pixels of a (2-j+2)-th column in an even-numbered row of the pixels, and an (n+3)-th gate line is connected to one of the pixels of a (2-j+1)-th column and one of the pixels of a (2-j+2)-th column in an odd-numbered row of the pixels.

9. The display device of claim 6,
wherein each pixel further comprises a transistor having a source and a drain, and wherein the common lines comprise a same material as at least one of the source and the drain of each transistor.

10. The display device of claim 9, wherein the common lines are formed in the same layer as the data lines.

* * * * *